(12) United States Patent
Niiyama

(10) Patent No.: US 11,559,916 B2
(45) Date of Patent: Jan. 24, 2023

(54) ELECTRIC WORKING MACHINE

(71) Applicant: MAKITA CORPORATION, Anjo (JP)

(72) Inventor: Takuma Niiyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 401 days.

(21) Appl. No.: 16/777,390

(22) Filed: Jan. 30, 2020

(65) Prior Publication Data

US 2020/0246998 A1 Aug. 6, 2020

(30) Foreign Application Priority Data

Feb. 1, 2019 (JP) .............................. JP2019-017382

(51) Int. Cl.
| | | |
|---|---|---|
| H02K 9/06 | (2006.01) | |
| H02K 7/14 | (2006.01) | |
| H02K 5/04 | (2006.01) | |
| B27B 17/00 | (2006.01) | |
| B23D 57/02 | (2006.01) | |
| B25F 5/00 | (2006.01) | |

(52) U.S. Cl.
CPC ........ B27B 17/0008 (2013.01); B23D 57/023 (2013.01); B25F 5/008 (2013.01); H02K 5/04 (2013.01); H02K 7/145 (2013.01); H02K 9/06 (2013.01)

(58) Field of Classification Search
CPC .................................. H02K 7/145; H02K 9/06
USPC ................................................... 310/50, 75 B
See application file for complete search history.

(56) References Cited

U.S. PATENT DOCUMENTS

2014/0259692 A1* 9/2014 Racov .................... A01D 34/90
173/217

FOREIGN PATENT DOCUMENTS

| JP | 2007-290071 A | 11/2007 |
|---|---|---|
| JP | 2016-10397 A | 1/2016 |
| JP | 2017-112953 A | 6/2017 |
| JP | 2019-7452 A | 1/2019 |
| WO | 2013/062457 A1 | 5/2013 |

OTHER PUBLICATIONS

Office Action dated Aug. 2, 2022, issued in Japanese Application No. 2019-017382.

* cited by examiner

*Primary Examiner* — Jose A Gonzalez Quinones

(74) *Attorney, Agent, or Firm* — Sughrue Mion, PLLC

(57) ABSTRACT

An electric working machine may include: a support rod constituted of metal; a tool disposed at a front end of the support rod; a motor configured to drive the tool; a control unit disposed at a rear end of the support rod and configured to control the motor; and a heat transfer structure configured to transfer heat from the control unit to the support rod.

7 Claims, 4 Drawing Sheets

ELECTRIC WORKING MACHINE

CROSS-REFERENCE TO RELATED APPLICATION

This application claims priority to Japanese Patent Application No. 2019-017382, filed on Feb. 1, 2019, the entire contents of which are incorporated herein by reference.

TECHNICAL FIELD

The technique disclosed herein relates to an electric working machine.

BACKGROUND

International Publication No. WO2013/062457 describes an electric working machine that is provided with a support rod, a tool disposed at a front end of the support rod, a motor configured to drive the tool, and a control unit disposed at a rear end of the support rod and configured to control the motor.

SUMMARY

In the electric working machine described above, increasing the output of the motor results in an increase in an amount of heat generated by the control unit correspondingly, as a result of which the control unit may have a high temperature. If the control unit becomes too hot, malfunctions may occur in the control unit. The disclosure herein provides a technique capable of improving cooling performance for a control unit that controls a motor in an electric working machine.

The disclosure herein discloses an electric working machine. The electric working machine may include a support rod constituted of metal, a tool disposed at a front end of the support rod, a motor configured to drive the tool, a control unit disposed at a rear end of the support rod and configured to control the motor, and a heat transfer structure configured to transfer heat of the control unit to the support rod.

According to the above configuration, the heat of the control unit is transferred to the support rod by the heat transfer structure. As such, the support rod can function as a heat dissipator that dissipates the heat of the control unit. Cooling performance for the control unit can thereby be improved.

DETAILED DESCRIPTION

Figure 1:
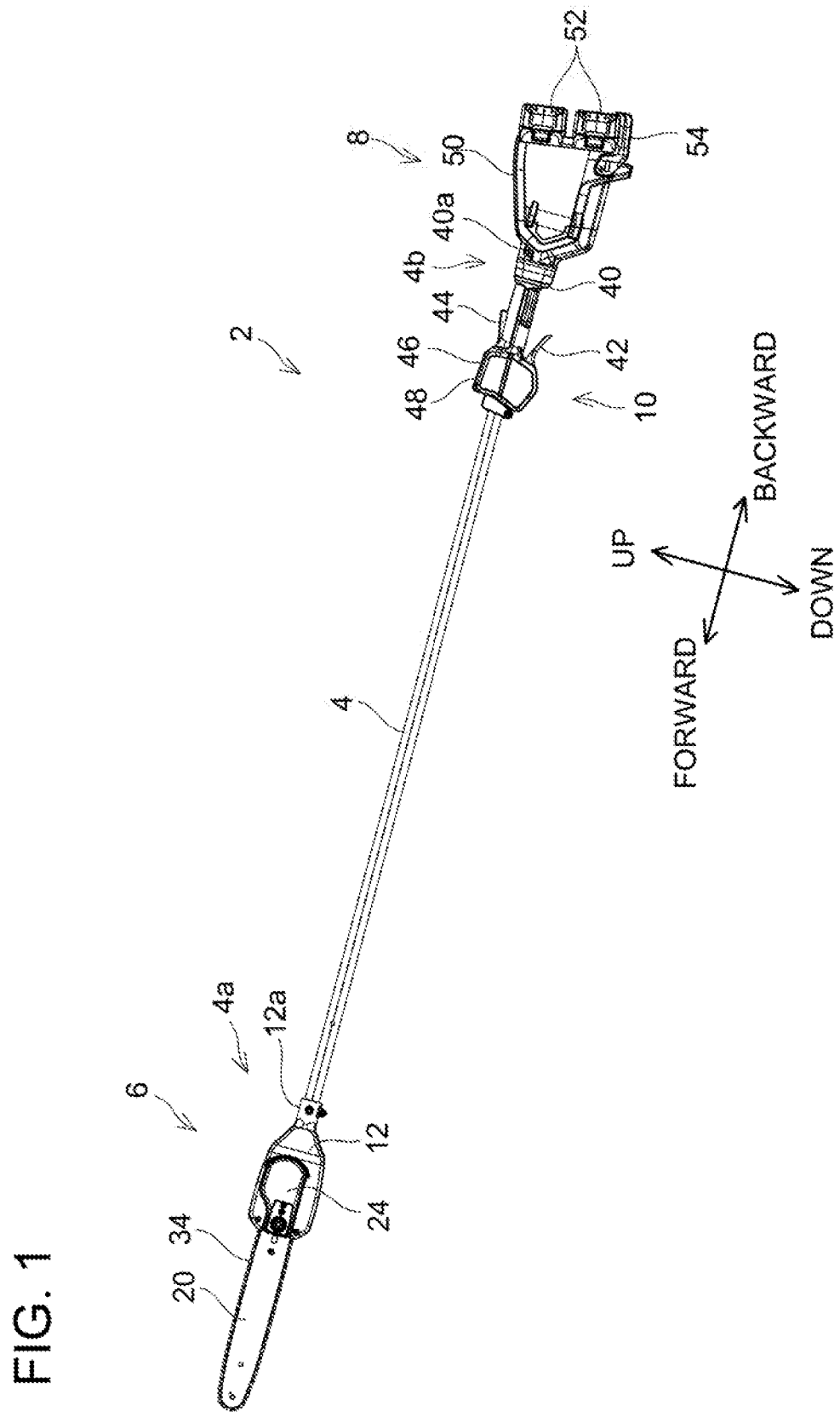
FIG. 1 is a side view showing a pole saw 2 of an embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, an electric working machine may include a support rod constituted of metal; a tool disposed at a front end of the support rod; a motor configured to drive the tool; a control unit disposed at a rear end of the support rod and configured to control the motor; and a heat transfer structure configured to transfer heat of the control unit to the support rod.

According to the above configuration, the heat of the control unit is transferred to the support rod by the heat transfer structure. As such, the support rod can function as a heat dissipator that dissipates the heat of the control unit. The cooling performance for the control unit can thereby be improved.

In one or more embodiments, the electric working machine may further comprise a fan driven by the motor. Cooling air generated by the fan may flow inside of the support rod.

According to the above configuration, the support rod is cooled by the cooling air flowing inside the support rod. Therefore, an amount of heat dissipated from the control unit via the support rod can be increased. The cooling performance for the control unit can be further improved.

In one or more embodiments, the electric working machine may further comprise a housing that accommodates the control unit. A section of the housing in which the control unit is accommodated may be sealed.

According to the above configuration, even when water or dust enters the inside of the housing, the water or dust can be prevented from reaching the control unit.

In one or more embodiments, the electric working machine may further comprise a grip housing constituted of resin. The grip housing may be mounted on the support rod and is configured to be grasped by a user.

In the configuration where the heat of the control unit is transferred to the support rod by the heat transfer structure, the support rod may have a high temperature. Even when the support rod has a high temperature, the grip housing constituted of resin does not have a temperature as high as the support rod. According to the above configuration, even when the support rod is at a high temperature, the user can handle the electric working machine by holding the grip housing without directly holding the support rod at a high temperature.

Embodiments

Hereinafter, a pole saw 2, which is an example of electric working machine, will be described with reference to the drawings. The pole saw 2 shown in FIG. 1 is an electric working machine for horticulture, and is used for pruning high branches and the like. The pole saw 2 includes a support rod 4, a front end unit 6 provided at a front end 4*a* of the support rod 4, a rear end unit 8 provided at a rear end 4*b* of the support rod 4, and a grip unit 10 provided near the rear end 4*b* of the support rod 4. The support rod 4 is a hollow metallic member having a round pipe shape and extends linearly from the front end 4*a* to the rear end 4*b*.

Figure 2:
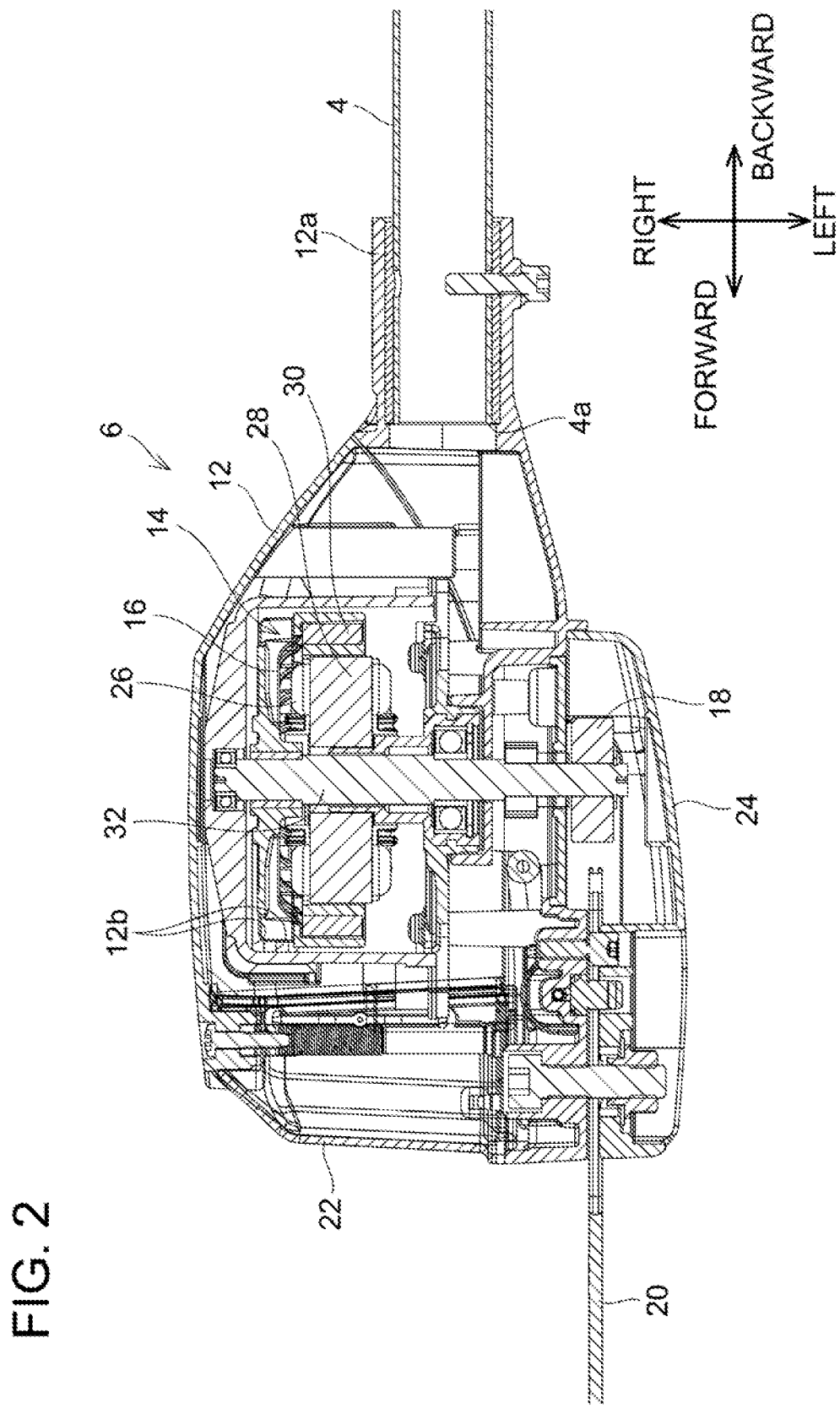
FIG. 2 is a cross-sectional view of a front end unit 6 of the pole saw 2 of the embodiment.

As shown in FIG. 2, the front end unit 6 includes a front end housing 12, a motor 14, a fan 16, a sprocket 18, a guide bar 20, an oil pump (not shown), an oil tank 22, and a sprocket cover 24. The front end housing 12 is a member constituted of resin. The motor 14, the fan 16, and the oil pump are accommodated in the front end housing 12. The motor 14 is an outer rotor-type brushless DC motor that includes a stator 28 around which a coil 26 is wound and a rotor 30 disposed on outer side relative to the stator 28. A position of the stator 28 is fixed relative to the front end housing 12. The rotor 30 is fixed to a drive shaft 32 via the fan 16. The drive shaft 32 extends in a right-left direction (vertical direction in FIG. 2) and is held rotatably with respect to the front end housing 12. A left end of the drive shaft 32 is positioned outside of the front end housing 12. The sprocket 18 is fixed to the left end of the drive shaft 32. When the rotor 30 is rotated by the driving of the motor 14, the fan 16, the drive shaft 32, and the sprocket 18 are also rotated integrally. As shown in FIG. 1, the guide bar 20 is a member having an elongated plate shape. A longitudinal direction of the guide bar 20 is along a front-rear direction, and a lateral direction thereof is along an up-down direction. As shown in FIG. 2, the guide bar 20 is attached to a left surface of the front end housing 12. A saw chain 34 (shown in FIG. 1) is hung around the sprocket 18 and the guide bar 20. When the sprocket 18 rotates, the saw chain 34 moves along a periphery of the guide bar 20, by which an object to be cut is cut. The sprocket cover 24 is attached to the left surface of the front end housing 12 so as to cover the sprocket 18 and a rear end of the guide bar 20. The oil pump supplies lubricating oil stored in the oil tank 22 to the saw chain 34 in conjunction with the rotation of the drive shaft 32. The oil tank 22 is attached to a front surface of the front end housing 12.

The support rod 4 is fixed to the front end housing 12 with the front end 4*a* inserted in a cylindrical portion 12*a* of the front end housing 12. An internal space of the support rod 4 communicates with an internal space of the front end housing 12. Motor power lines (not shown) that supply power to the coil 26 of the motor 14 extend from the internal space of the front end housing 12, through the internal space of the support rod 4, to the rear end unit 8. A discharge port 12*b* is provided near the fan 16 of the front end housing 12. When the fan 16 rotates, air is sucked from the internal space of the support rod 4 into the internal space of the front end housing 12. The sucked air passes through the motor 14 to cool the motor 14 and then is discharged from the internal space of the front end housing 12 to outside of the front end housing 12 through the discharge port 12*b*.

Figure 3:
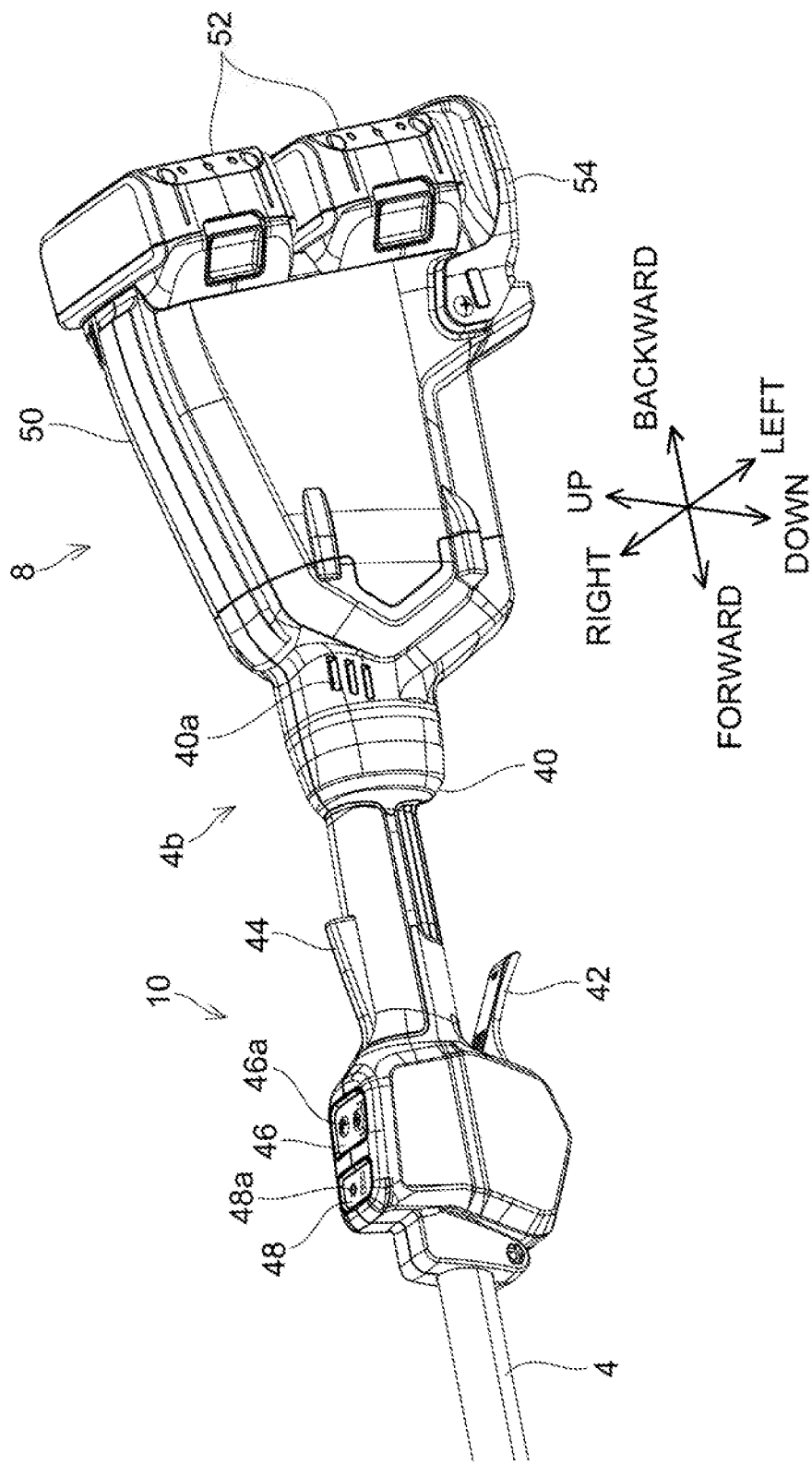
FIG. 3 is a perspective view showing a rear end unit 8 and a grip unit 10 of the pole saw 2 of the embodiment.

As shown in FIG. 3, the grip unit 10 includes a grip housing 40, a trigger 42, a lock-off lever 44, an operation panel 46, and a display panel 48. The grip housing 40 is a member that is constituted of resin and is formed in a shape that covers an outer surface of the support rod 4. The support rod 4 is fixed to the grip housing 40 in a state of penetrating the grip housing 40. A rear portion of the grip housing 40 has a shape that expands rearward.

The trigger 42 is provided on a lower surface of the grip housing 40. The trigger 42 is operated to drive the motor 14 of the front end unit 6. In a state where the trigger 42 is not pushed in, supply of electric power to the motor 14 is cut off. In a state where the trigger 42 is pushed in, electric power is supplied to the motor 14. A trigger switch (not shown) configured to detect the push operation on the trigger 42 is accommodated in the grip housing 40. The lock-off lever 44 is provided on an upper surface of the grip housing 40. The lock-off lever 44 is a lever configured to restrict the push operation on the trigger 42 and release the restriction. In a state where the lock-off lever 44 is not pushed in, the push operation on the trigger 42 is restricted. In a state where the lock-off lever 44 is pushed in, the restriction of the push operation on the trigger 42 is released. The user can drive the motor 14 by grasping the grip housing 40 while pushing in the lock-off lever 44 with his/her palm of one hand and pushing in the trigger 42 with the finger of the hand.

The operation panel 46 and the display panel 48 are provided on the upper surface of the grip housing 40 on a front side relative to the lock-off lever 44. The operation panel 46 is provided with an operation button 46*a* that is for controlling the driving of the motor 14 of the front end unit 6. An operation circuit board (not shown) that is configured to detect an operation on the operation button 46*a* is accommodated in the grip housing 40. By operating the operation button 46*a*, the user can switch the driving and stopping of the motor 14, switch the rotation directions of the motor 14, and change the rotation speed of the motor 14. A display lamp 48*a* configured to display the operating state of the pole saw 2 is mounted on the display panel 48. A display circuit board (not shown) that is configured to control the operation of the display lamp 48*a* is accommodated in the grip housing 40. A signal line (not shown) extending from each of the trigger switch, the operation circuit board, and the display circuit board passes through a space between the support rod 4 and the grip housing 40, and extends up to the rear end unit 8.

Figure 4:
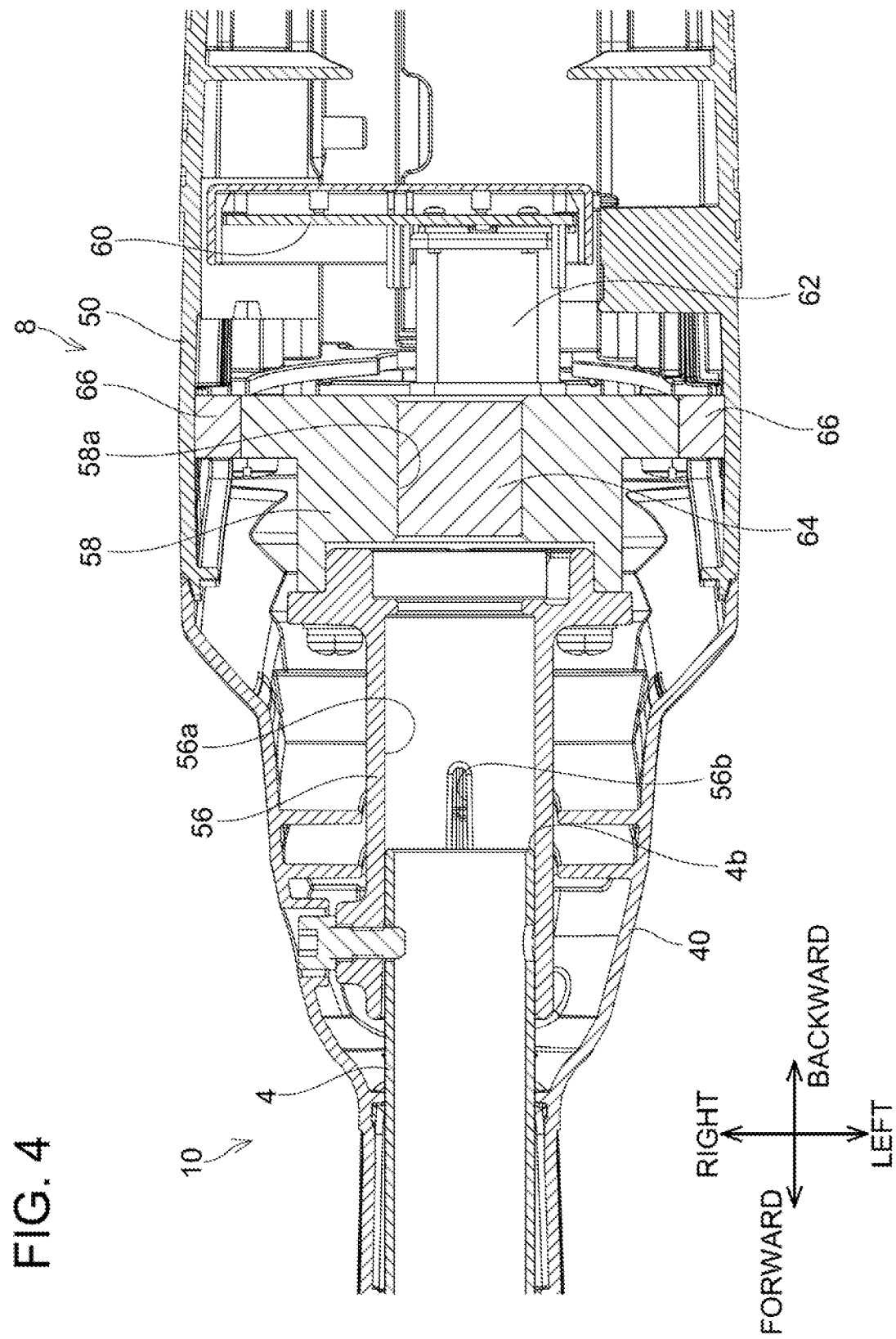
FIG. 4 is a cross-sectional view of the rear end unit 8 of the pole saw 2 of the embodiment.

As shown in FIGS. 3 and 4, the rear end unit 8 includes a rear end housing 50, battery packs 52, a battery cover 54, a coupling member 56, a support member 58, a control circuit board 60, and a heat transfer member 62. The rear end housing 50 is a member constituted of resin. A front end of the rear end housing 50 is connected to a rear end of the grip housing 40. The battery packs 52 include a plurality of rechargeable battery cells (not shown). The battery cells are, for example, lithium ion battery cells. As shown in FIG. 3, the battery packs 52 are detachably attached to a rear surface of the rear end housing 50. The battery packs 52 are attached to and detached from the rear end housing 50 by being slid in the right-left direction with respect to the rear end housing 50. The battery cover 54 is attached to the rear end housing 50 so as to cover a lower surface of the battery packs 52.

As shown in FIG. 4, the coupling member 56 is fixed to the rear end housing 50 via the support member 58. The coupling member 56 is a member constituted of metal. The coupling member 56 is provided with a through hole 56*a* that has a substantially round columnar shape extending along the front-rear direction. The support rod 4 is fixed to the coupling member 56 with its rear end 4b inserted into the through hole 56a of the coupling member 56. The support member 58 is a member constituted of metal. The support member 58 is provided with a through hole 58a that has a substantially round columnar shape extending along the front-rear direction. The coupling member 56 is fixed to the support member 58 with the through hole 56a communicating with the through hole 58a. In a state where the rear end unit 8 and the grip unit 10 are mounted on the support rod 4, the coupling member 56 is disposed inside the grip housing 40 of the grip unit 10.

The control circuit board 60 is configured to control the driving of the motor 14 in response to operations on the operation panel 46 and the trigger 42. The control circuit board 60 includes a plurality of switching elements (not shown) for controlling electric power supplied to the motor 14. The control circuit board 60 further controls display on the display panel 48. The control circuit board 60 is disposed inside the rear end housing 50 on a rear side relative to the support member 58. The control circuit board 60 is disposed along the up-down direction and the right-left direction. In other words, the control circuit board 60 is disposed such that its normal direction is along the front-rear direction. The heat transfer member 62 is interposed between the support member 58 and the control circuit board 60. The heat transfer member 62 is a member constituted of metal. The motor power lines, which extend from the front end unit 6 through the internal space of the support rod 4, pass through the through hole 56a of the coupling member 56 and the through hole 58a of the support member 58 and are connected to the control circuit board 60. The through hole 58a of the support member 58 is provided with a grommet 64 through which the motor power lines pass. The signal lines, which extend from the grip unit 10 through the space between the support rod 4 and the grip housing 40, pass through a space between the coupling member 56 and the grip housing 40, pass through a space between the support member 58 and the rear end housing 50, and are connected to the control circuit board 60. The space between the support member 58 and the rear end housing 50 is provided with a grommet 66 through which the signal lines from the trigger switch, the operation circuit board, and the display circuit board pass. A space of the rear end housing 50 in which the control circuit board 60 is accommodated is sealed by the grommets 64 and 66.

As shown in FIG. 3, an air supply port 40a is provided in the rear portion of the grip housing 40. As shown in FIG. 4, a notch 56b is provided in the coupling member 56. Therefore, when air is sucked from the through hole 56a of the coupling member 56 to the inside of the support rod 4, air flows into the grip housing 40 through the air supply port 40a, and air also flows into the through hole 56a of the coupling member 56 from the outside of the coupling member 56 through the notch 56b. That is, when the fan 16 of the front end unit 6 rotates in the pole saw 2, air flows in from the outside of the grip unit 10 through the air supply port 40a, the air which has flowed into the inside of the grip unit 10 flows into the support rod 4 through the notch 56b and the through hole 56a of the coupling member 56, the air which has flowed into the support rod 4 flows through the inside of the support rod 4 and flows into the front end housing 12 of the front end unit 6, and the air which has flowed into the front end housing 12 flows through the motor 14 and then is discharged to the outside of the front end housing 12 through the discharge port 12b.

When the motor 14 is driven in the pole saw 2, the control circuit board 60 generates heat due to the operation of the switching elements. The heat generated by the control circuit board 60 is transferred to the support rod 4 via the heat transfer member 62, the support member 58, and the coupling member 56. Further, the fan 16 rotates as the motor 14 is driven, and this generates the air flow from the air supply port 40a of the grip unit 10 to the discharge port 12b of the front end unit 6. As a result, the coupling member 56, the support rod 4, and the motor 14 are cooled thereby. That is, in the pole saw 2, the heat generated by the control circuit board 60 is transferred to the support rod 4, and the support rod 4 is cooled by the cooling air generated by the fan 16, as a result of which the control circuit board 60 can be cooled. In the pole saw 2, the control circuit board 60 is disposed along the up-down direction and the right-left direction. With such a configuration, the heat of the control circuit board 60 can be easily transferred to the support rod 4.

As described above, in one or more embodiments, the pole saw 2 (an example of electric working machine) includes the support rod 4 constituted of metal, the saw chain 34 (an example of tool) disposed at the front end 4a of the support rod 4, the motor 14 configured to drive the saw chain 34, the control circuit board 60 (an example of control unit) disposed at the rear end 4b of the support rod 4 and configured to control the motor 14, and the coupling member 56, the support member 58, and the heat transfer member 62 (an example of heat transfer structure) configured to transfer the heat of the control circuit board 60 to the support rod 4.

According to the above configuration, the heat of the control circuit board 60 is transferred to the support rod 4 by the coupling member 56, the support member 58, and the heat transfer member 62. Thus, the support rod 4 can function as a heat dissipator that dissipates the heat of the control circuit board 60. The cooling performance for the control circuit board 60 can be improved.

In one or more embodiments, the pole saw 2 further includes the fan 16 driven by the motor 14. The cooling air generated by the fan 16 flows inside of the support rod 4.

According to the above configuration, the support rod 4 is cooled by the cooling air flowing inside the support rod 4. Therefore, an amount of heat dissipated from the control circuit board 60 via the support rod 4 can be further increased. The cooling performance for the control circuit board 60 can be further improved.

In one or more embodiments, the pole saw 2 further includes the rear end housing 50 (an example of housing) that accommodates the control circuit board 60. The section of the rear end housing 50 in which the control circuit board 60 is accommodated is sealed.

According to the above configuration, even when water or dust enters inside of the rear end housing 50, the water or dust can be prevented from reaching the control circuit board 60.

In one or more embodiments, the pole saw 2 further includes the grip housing 40 constituted of resin. The grip housing 40 is mounted on the support rod 4 and is configured to be grasped by the user.

In the configuration where the heat of the control circuit board 60 is transferred to the support rod 4 by the coupling member 56, the support member 58, and the heat transfer member 62, the support rod 4 may be at a high temperature. Even when the support rod 4 is at a high temperature, the grip housing 40 constituted of resin does not have a temperature as high as the support rod 4. According to the above configuration, even when the support rod 4 is at a high temperature, the user can handle the pole saw 2 by grasping the grip housing 40 without directly grasping the support rod 4 at a high temperature.

In the embodiment described above, the motor 14 and the fan 16 are accommodated in the front end unit 6, however, the motor 14 and the fan 16 may be accommodated in the rear end unit 8. In this case, the drive shaft 32 of the motor 14 passes through the inside of the support rod 4 in place of the motor power lines, and a power transmission mechanism including bevel gears is disposed in the front end unit 6, by which the sprocket 18 can be rotated by the motor 14.

In the above embodiment, the motor 14 is a brushless DC motor, however, the motor 14 may be a DC motor with a brush or another type of motor.

In the above embodiment, electric power is supplied from the battery packs 52 to the pole saw 2, however, electric power may be supplied to the pole saw 2 via a power cord (not shown) instead of the battery packs 52.

In the above embodiment, the electric working machine is the pole saw 2 and the tool is the saw chain 34, however, the electric working machine may be a brush cutter, a mower, a pole hedge trimmer, or the like, and the tool may be a rotary cutting blade, a hedge trimmer, a brush, a sweeper, a mop, or the like.

What is claimed is:

1. An electric working machine, comprising:
    a support rod constituted of metal;
    a tool disposed at a front end of the support rod;
    a motor configured to drive the tool;
    a control unit disposed at a rear end of the support rod and configured to control the motor; and
    a heat transfer structure configured to transfer heat from the control unit to the support rod; and
    a housing that accommodates the control unit,
    wherein
    the heat transfer structure is directly coupled to the support rod and the control unit, and
    a thermal conductivity of the heat transfer structure is higher than a thermal conductivity of the housing.
2. The electric working machine according to claim 1, further comprising a fan driven by the motor,
    wherein cooling air generated by the fan flows inside of the support rod.
3. The electric working machine according to claim 2, wherein a section of the housing in which the control unit is accommodated is sealed.
4. The electric working machine according to claim 1, further comprising a grip housing constituted of resin,
    wherein the grip housing is mounted on the support rod and is configured to be grasped by a user.
5. The electric working machine according to claim 1, wherein
    the heat transfer structure comprises:
        a support member; and
        a coupling member fixed to the housing via the support member and fixed to the support rod,
    the housing is constituted of resin, and
    the heat transfer structure is constituted of metal.
6. The electric working machine according to claim 2, wherein cooling air generated by the fan flows into inside of the support rod without passing through the control unit.
7. The electric working machine according to claim 1, wherein
    the housing includes an air supply port communicating outside of the housing with inside of the housing,
    the heat transfer structure includes an air inlet, and
    cooling air generated by the fan flows into inside of the support rod from outside of the housing through the air supply port and the air inlet.

* * * * *